UNITED STATES PATENT OFFICE.

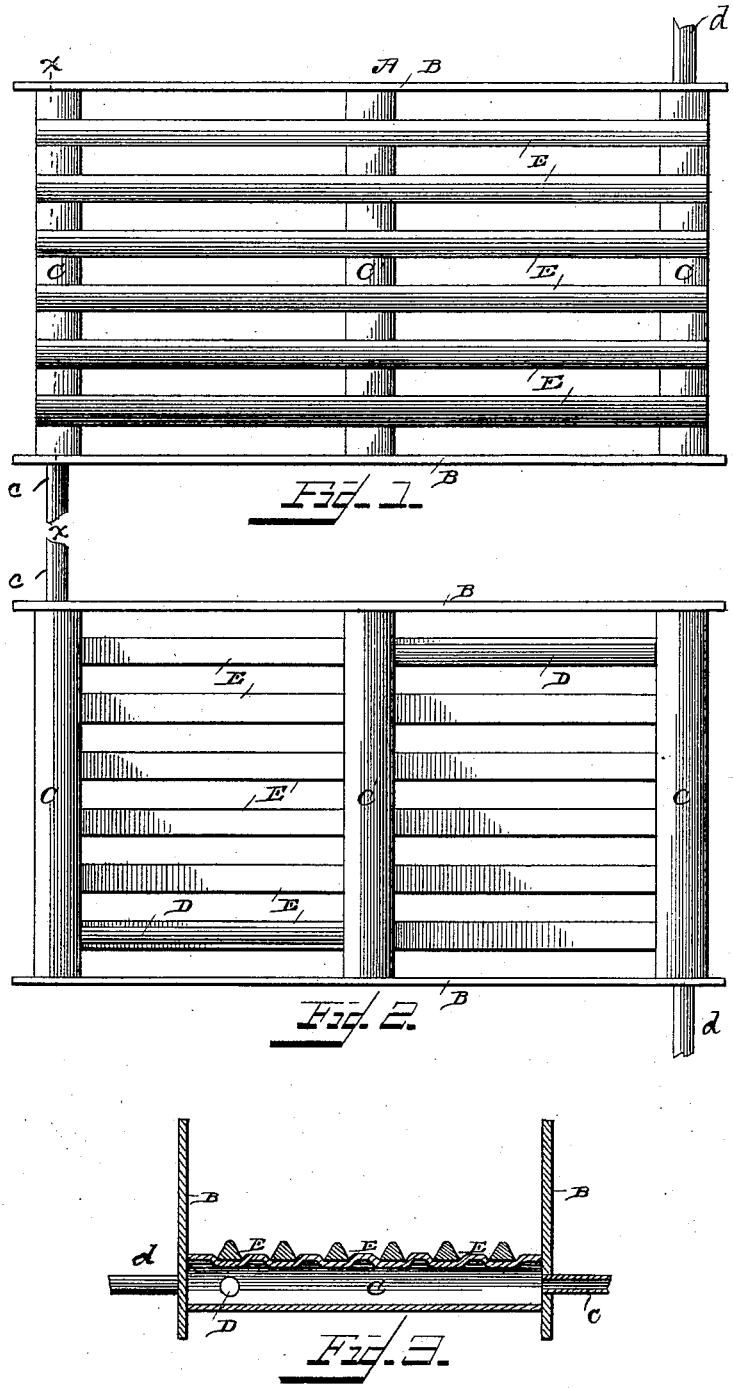

WILLIAM PERRY COMMODORE ALLEN, OF HOOSIERVILLE, INDIANA.

COAL-SCREEN.

SPECIFICATION forming part of Letters Patent No. 323,772, dated August 4, 1885.

Application filed June 1, 1885. (No model.)

*To all whom it may concern:*

Be it known that I, WILLIAM P. C. ALLEN, a citizen of the United States, residing at Hoosierville, in the county of Clay and State of Indiana, have invented a new and useful Improvement in Coal-Screens, of which the following is a specification, reference being had to the accompanying drawings.

My invention relates to an improvement in coal-screens, the object being to provide the same with a series of steam-pipes so arranged with relation to the screen-bars that the steam in passing through said pipes will heat the bars, and thus prevent the coal from becoming frozen in cold weather, or ice from accumulating on the bars of the screen.

With these ends in view, the invention consists in the improved construction and combinations of parts hereinafter fully described, and pointed out in the claims.

In the drawings, Figure 1 is a plan view of a screen embodying my invention. Fig. 2 is a bottom view of the same; and Fig. 3 is a transverse vertical section on the line $x$ $x$ of Fig. 1.

In the accompanying drawings, in which like letters of reference indicate corresponding parts in all the figures, A represents the screen, which consists of the sides B, connected at intervals, as shown, by the transverse pipes C C', the pipes C being arranged at the ends of the sides, and the pipe C' about midway the length of the same. The pipes C C' are connected by pipes D, arranged at opposite ends of the pipes, as shown, thus establishing communication between all of the pipes. Upon the upper sides of the pipes C C' are arranged the screen-bars E, which are triangular in cross-section, so that water and other substances will readily run therefrom. These bars E are sunk or let into the pipes C C', which are depressed to receive them. The pipe C has an opening in one of its ends in which is fitted a pipe, $c$, while the other pipe C is provided in one of its ends, on the opposite end to that at which the pipe $c$ is located, with an opening in which is fitted a pipe, $d$.

The operation is as follows: The coal is placed upon the screen-bars to be screened. The coal, as it is brought from the mine, is in a very wet condition, and in cold weather freezes upon the screen, thus making it necessary to frequently clean the same. Steam enters through the pipe $c$, and from there passes through the pipe D, then through pipe C', then through the other pipes D C, and out through the pipe $d$. By this construction the grate-bars are kept warm, and it is impossible for water to freeze upon the same. It also keeps the coal from freezing.

The improvement before described is simple in its construction, strong and durable, and thoroughly effective for the purposes intended.

Having thus described my invention, what I claim as new, and desire to secure by Letters Patent, is—

1. In a coal-screen, the combination, with the sides of steam-pipes connecting said sides, inlet and outlet pipes, and a series of grate-bars supported on the steam-pipes, as set forth.

2. In a coal-screen, the combination, with a series of steam-pipes, C C', and the pipes D, connecting said pipes C C', of a series of grate-bars supported on the pipes C C', as set forth.

In testimony that I claim the foregoing as my own I have hereto affixed my signature in presence of two witnesses.

his
WILLIAM PERRY × COMMODORE ALLEN.
mark.

Witnesses:
PRESTON B. TRIPLETT,
A. H. NALL.